(12) United States Patent
Tu et al.

(10) Patent No.: US 11,523,094 B2
(45) Date of Patent: Dec. 6, 2022

(54) DISPLAY SYSTEM FOR DISPLAYING PANORAMIC IMAGE AND OPERATION METHOD THEREOF

(71) Applicant: Coretronic Corporation, Hsin-Chu (TW)

(72) Inventors: Hsun-Cheng Tu, Hsin-Chu (TW); Chien-Chun Peng, Hsin-Chu (TW); Chi-Wei Lin, Hsin-Chu (TW); Chung-Cheng Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/578,407

(22) Filed: Jan. 18, 2022

(65) Prior Publication Data

US 2022/0239875 A1 Jul. 28, 2022

(30) Foreign Application Priority Data

Jan. 28, 2021 (CN) .......................... 202110116771.7

(51) Int. Cl.
*H04N 9/31* (2006.01)

(52) U.S. Cl.
CPC ......... *H04N 9/3185* (2013.01); *H04N 9/3147* (2013.01); *H04N 9/3182* (2013.01); *H04N 9/3194* (2013.01)

(58) Field of Classification Search
CPC .. H04N 9/3147; H04N 9/3185; H04N 9/3194; H04N 9/3182; H04N 9/31
USPC .................................. 348/744, 745, 36, 750
See application file for complete search history.

(56) References Cited

U.S. PATENT DOCUMENTS

| 6,804,406 B1* | 10/2004 | Chen ........................ H04N 5/74 348/745 |
| 2002/0027608 A1* | 3/2002 | Johnson ............... H04N 9/3147 348/745 |
| 2017/0353737 A1 | 12/2017 | Lin et al. |

FOREIGN PATENT DOCUMENTS

| CN | 102893594 | 1/2013 |
| CN | 103019643 | 12/2015 |
| CN | 110264406 | 9/2019 |
| TW | M372955 | 1/2010 |

* cited by examiner

Primary Examiner — Sherrie Hsia
(74) *Attorney, Agent, or Firm* — JCIPRNET

(57) ABSTRACT

A display system for displaying a panoramic image and an operation method thereof are provided. The display system for displaying a panoramic image includes N projectors and a controller. The N projectors project N sub-images according to N image data and form a panoramic image. Each sub-image has a sub-image overlapping area, so that two adjacent sub-images of the N sub-images partially overlap, and that a first sub-image and an $N^{th}$ sub-image of the N sub-images partially overlap. The controller copies a first edge image corresponding to a first edge of an original image and connects the first edge image to a second edge of the original image that is opposite to the first edge, so as to generate an extended image corresponding to the sub-image overlapping area. The controller slices an adjusted image containing the original image and the extended image to generate the N image data.

16 Claims, 4 Drawing Sheets

DISPLAY SYSTEM FOR DISPLAYING PANORAMIC IMAGE AND OPERATION METHOD THEREOF

CROSS-REFERENCE TO RELATED APPLICATION

This application claims the priority benefit of China application serial no. 202110116771.7, filed on Jan. 28, 2021. The entirety of the above-mentioned patent application is hereby incorporated by reference herein and made a part of this specification.

BACKGROUND

Technical Field

The disclosure relates to a display system, and more particularly to a display system for displaying a panoramic image and an operation method thereof.

Description of Related Art

At present, a panoramic image may be formed through a fusion method of stitching images. A display system for displaying such a panoramic image requires establishment of a panoramic coordinate system. Generally, multiple projectors are connected in a wired or wireless manner, and a coordinate system corresponding to panoramic image information of each projector is generated by using a stitching system. The coordinate system corresponding to the panoramic image information may be obtained through the calculation of the system after images are captured by multiple cameras. In general, the beginning and end of an image information are subjected to image slicing by a side-by-side slicing method. That is, images at two opposite ends of the image are stitched side by side. However, in such a method of stitching the beginning with the end, the images may not be completely aligned at the stitching boundaries due to deviation of relative position of a projector in use or the like. As a result, a gap with no image during image stitching may be generated, thereby affecting viewing experience of users.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a display system for displaying a panoramic image and an operation method thereof, so as to provide a panoramic image without a stitching gap.

Other objects and advantages of the disclosure may be further understood from the technical features disclosed herein.

In order to achieve one or a part or all of the above or other objects, an embodiment of the disclosure provides a display system for displaying a panoramic image, the display system including N projectors and a controller. The N projectors respectively project N sub-images according to N image data, and the N sub-images are sequentially connected and form a panoramic image, where N is a positive integer greater than 1. Each of the sub-images has a sub-image overlapping area, so that two adjacent sub-images of the N sub-images partially overlap, and that a first sub-image and an $N^{th}$ sub-image of the N sub-images partially overlap. The controller receives an original image. The controller copies a first edge image corresponding to a first edge of the original image and connects the first edge image to a second edge of the original image that is opposite to the first edge, so as to generate an extended image corresponding to the sub-image overlapping area. The controller slices an adjusted image containing the original image and the extended image to generate the N image data. The controller transmits the N image data respectively to the N projectors. Each of the image data has overlapping area image data corresponding to the sub-image overlapping area.

In order to achieve one or a part or all of the above or other objects, an embodiment of the disclosure provides an operation method of a display system for displaying a panoramic image. The display system includes N projectors and a controller. The operation method includes the following. An original image is received by the controller, and a first edge image corresponding to a first edge of the original image is copied by the controller to connect to a second edge of the original image that is opposite to the first edge, so as to generate an extended image. An adjusted image containing the original image and the extended image is sliced by the controller to generate N image data. The N image data are respectively transmitted to the N projectors by the controller. N sub-images are respectively projected by the N projectors according to the N image data. The N sub-images are sequentially connected in series and form a panoramic image. Each of the sub-images has a sub-image overlapping area, so that two adjacent sub-images of the N sub-images partially overlap, and that a first sub-image and an $N^{th}$ sub-image of the N sub-images partially overlap. The extended image corresponds to the sub-image overlapping area. Each of the image data has overlapping area image data corresponding to the sub-image overlapping area.

Based on the above, the embodiments of the disclosure have at least one of the following advantages or effects. In the disclosure, the controller receives the original image, and copies the first edge image corresponding to the first edge of the original image and connects the first edge image to the second edge of the original image that is opposite to the first edge, so as to generate the extended image. Then, the controller slices the adjusted image containing the original image and the extended image to generate the N image data. The controller further transmits the N image data respectively to the N projectors, so that two adjacent sub-images of the N sub-images partially overlap, and that the first sub-image and the $N^{th}$ sub-image of the N sub-images partially overlap. In this way, it is possible to avoid a problem that images are not completely aligned at the stitching boundaries due to deviation of relative position of a projector in use or the like, and to avoid generating a stitching gap with no image. Moreover, the disclosure may further improve the viewing experience of users.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

In order to make the aforementioned features and advantages of the disclosure more comprehensible, embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
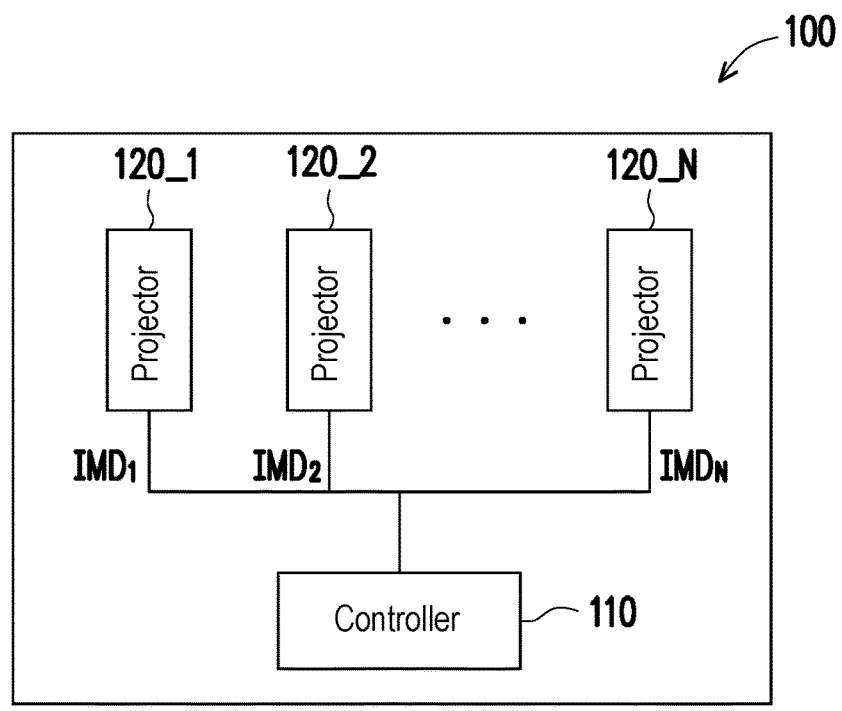
FIG. 1 is a schematic block diagram of a display system for displaying a panoramic image according to an embodiment of the disclosure.

FIG. 1 is a schematic block diagram of a display system for displaying a panoramic image according to an embodiment of the disclosure. Referring to FIG. 1, a display system 100 includes N projectors 120_1, 120_2 . . . and 120_N and a controller 110. The controller 110 is coupled to the N projectors 120_1, 120_2 . . . and 120_N. N is a positive integer greater than 1.

Figure 2:
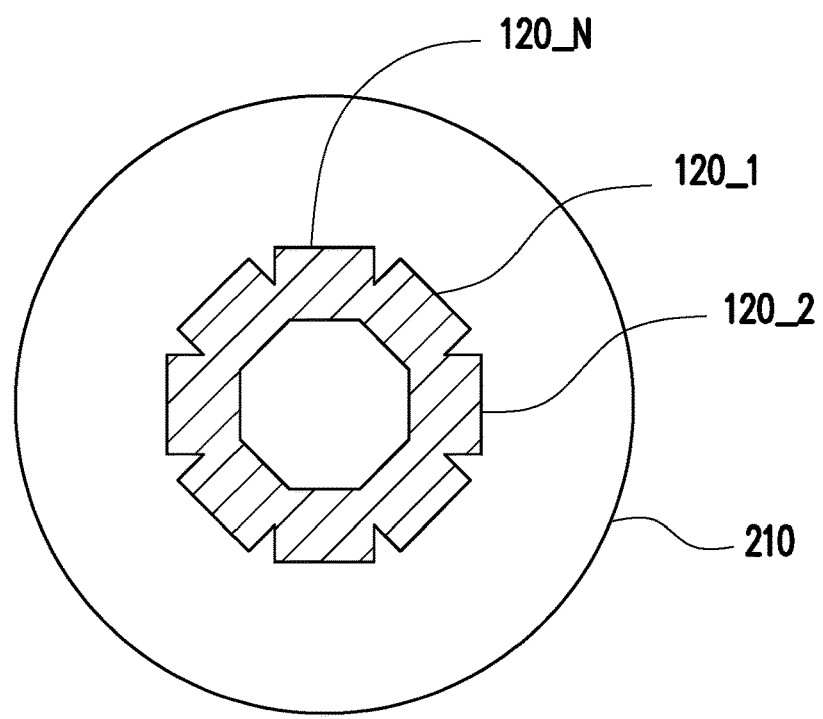
FIG. 2 is a schematic diagram of an application scenario of a display system for displaying a panoramic image according to an embodiment of the disclosure.
Figure 3:
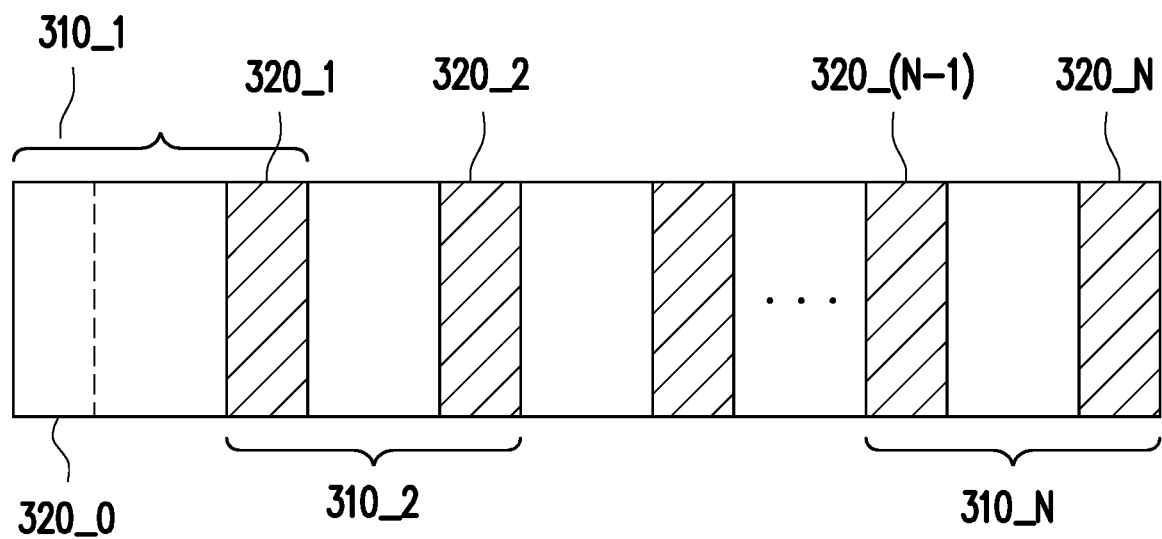
FIG. 3 is a schematic diagram of a projection image of a display system for displaying a panoramic image according to an embodiment of the disclosure.

FIG. 2 is a schematic diagram of an application scenario of a display system for displaying a panoramic image according to an embodiment of the disclosure. FIG. 3 is a schematic diagram of a projection image of a display system for displaying a panoramic image according to an embodiment of the disclosure. Referring to FIG. 1 to FIG. 3, as shown in FIG. 2, the N projectors 120_1, 120_2 . . . and 120_N in the display system 100 for displaying a panoramic image are arranged in a ring shape, and are connected to each other in a wired or wireless manner. The N projectors 120_1, 120_2 . . . and 120_N are respectively coupled to the controller 110. The N projectors 120_1, 120_2 . . . and 120_N of the display system 100 respectively project N sub-images to a panoramic projection screen 210 according to N image data $IMD_1$ to $IMD_N$, so that the N sub-images are sequentially connected in series and form a panoramic image on the panoramic projection screen 210. As shown in FIG. 2, the N projectors 120_1, 120_2 . . . and 120_N are enclosed by the panoramic projection screen 210.

Referring to FIG. 1 and FIG. 3, when the N projectors 120_1, 120_2 . . . and 120_N in the display system 100 for displaying a panoramic image respectively project the N sub-images to the panoramic projection screen 210 according to the N image data $IMD_1$ to $IMD_N$, the N sub-images, i.e., 310_1, 310_2 . . . and 310_N, have sub-image overlapping areas 320_0, 320_1 . . . and 320_N. Taking the sub-image 310_2 as an example, the sub-image 310_2 has the sub-image overlapping areas 320_1 and 320_2 respectively located at two edge regions (e.g. left edge region and right edge region) thereof, and the sub-image overlapping areas 320_1 and 320_2 respectively partially overlap the sub-images 310_1 and 310_3. The sub-image overlapping area 320_1 is formed by overlapping the right edge region of the sub-images 310_1 and the left edge region of the sub-image 310_2. The sub-image overlapping area 320_2 is formed by overlapping the right edge region of the sub-images 310_2 and the left edge region of the sub-image 310_3. Two adjacent sub-images of the sub-images 310_2, 310_3 . . . and 310_(N−1) partially overlap. The sub-image 310_N not only partially overlaps the sub-image 310_(N−1) in the sub-image overlapping area 320_N−1, but also partially overlaps the sub-image 310_1 in the sub-image overlapping area 320_N. In actual projection, the sub-image overlapping areas 320_0 and 320_N correspond to the same image data.

Figure 4:
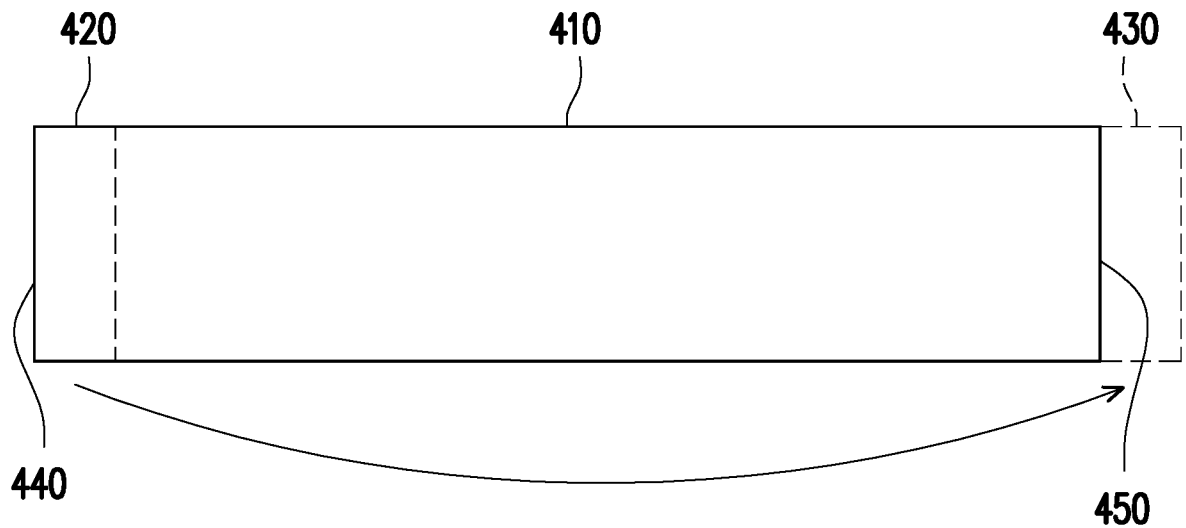
FIG. 4 is a schematic diagram of adjusting an original image by a controller of a display system for displaying a panoramic image according to an embodiment of the disclosure.

FIG. 4 is a schematic diagram of adjusting an original image by a controller of a display system for displaying a panoramic image according to an embodiment of the disclosure. Referring to FIG. 1 and FIG. 4, the controller 110 receives an original image 410 that is to be projected before the N projectors 120_1, 120_2 . . . and 120_N in the display system 100 performs projection. The controller 110 further copies a first edge image 420 corresponding to a first edge 440 of the original image 410 and connects the first edge image 420 to a second edge 450 of the original image 410, so as to generate an extended image 430 corresponding to the sub-image overlapping area (such as the sub-image overlapping area 320_N shown in FIG. 3). The extended image 430 and the original image 410 form an adjusted image. The second edge 450 is opposite to the first edge 440. The controller 110 slices the adjusted image, so as to generate the N image data $IMD_1$ to $IMD_N$. The N image data $IMD_1$ to $IMD_N$ are respectively transmitted to the N projectors 120_1, 120_2 . . . and 120_N. Each of the image data has overlapping area image data corresponding to the sub-image overlapping areas 320_0, 320_1 . . . and 320_N.

In an embodiment of the disclosure, the controller 110 is further configured to adjust brightness information of the overlapping area image data, so that the brightness of each of the sub-images 310_1, 310_2 . . . and 310_N corresponding to the sub-image overlapping areas 320_0, 320_1 . . . and 320_N decreases in a direction toward an edge of each sub-image, and the brightness of each of the sub-images 310_1, 310_2 . . . and 310_N corresponding to the sub-image overlapping areas 320_0, 320_1 . . . and 320_N is consistent with the brightness of each of the sub-images 310_1, 310_2 . . . and 310_N corresponding to the non-overlapping areas during projection. In an embodiment of the disclosure, the sub-image overlapping area of each of the sub-images 310_1, 310_2 . . . and 310_N may occupy 20% of the corresponding sub-image.

Figure 5:
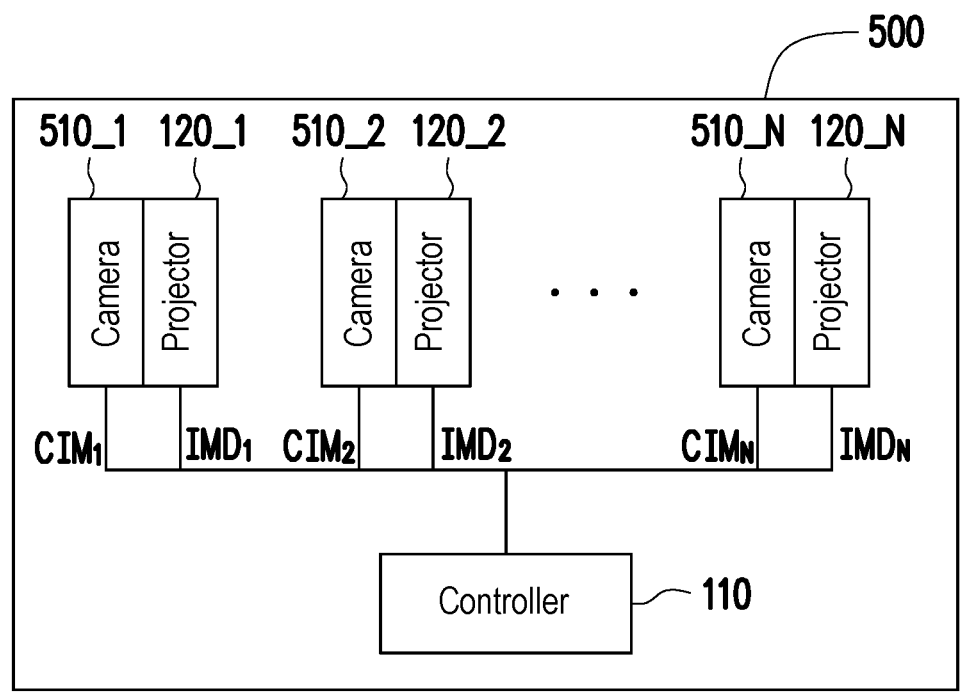
FIG. 5 is a schematic block diagram of a display system for displaying a panoramic image according to another embodiment of the disclosure.

FIG. 5 is a schematic block diagram of a display system for displaying a panoramic image according to another embodiment of the disclosure. Referring to FIG. 5, a display system 500 shown in FIG. 5 further includes N cameras 510_1, 510_2 ... and 510_N in addition to the N projectors 120_1, 120_2 ... and 120_N and the controller 110. The N cameras 510_1, 510_2 ... and 510_N are respectively disposed corresponding to the N projectors 120_1, 120_2 ... and 120_N. The N projectors 120_1, 120_2 ... and 120_N are connected to each other in a wired or wireless manner. The N projectors 120_1, 120_2 ... and 120_N and the N cameras 510_1, 510_2 ... and 510_N are respectively coupled to the controller 110. The N cameras 510_1, 510_2 ... and 510_N are configured to respectively perform the image capturing operation in projection directions of their corresponding projectors, so as to generate N captured images $CIM_1$ to $CIM_N$. Each of the captured images $CIM_1$ to $CIM_N$ includes the sub-image 310_1, 310_2 ... and 310_N correspondingly projected by each of the projectors 120_1, 120_2 ... and 120_N.

In an initialization stage of the display system 500, the controller 110 controls the N projectors 120_1, 120_2 ... and 120_N to project N test images. The controller 110 further controls the N cameras 510_1, 510_2 ... and 510_N to respectively capture the N test images. According to the N captured images $CIM_1$ to $CIM_N$ respectively containing the N test images, overlapping areas of projection ranges of the N projectors 120_1, 120_2 ... and 120_N may be determined, so as to obtain sub-image overlapping range information. The controller 110 is configured to slice the adjusted image according to the sub-image overlapping range information to generate the N image data $IMD_1$ to $IMD_N$, and transmit the N image data $IMD_1$ to $IMD_N$ respectively to the N projectors 120_1, 120_2 ... and 120_N for projection.

Taking four projectors (i.e., N equals 4) as an example, the controller 110 may control four projectors 120_1, 120_2, 120_3, and 120_4 to respectively project four grid pattern images (projection frames are all assumed to be 1920*1080 pixels). Each grid pattern image may include a grid pattern array (not shown). The controller 110 further controls four cameras 510_1, 510_2, 510_3, and 510_4 to capture the four grid pattern images. The controller 110 may determine overlapping areas of projection ranges of the four projectors 120_1, 120_2, 120_3, and 120_4 according to four captured images respectively containing the grid pattern images, and obtain a ratio of the sub-image overlapping area of the sub-images projected by two adjacent projectors to the sub-image. The ratio, for example, is 20%. That is, the sub-image the overlapping area 320_2 formed by the sub-image 310_2 and the sub-image 310_3 occupies 20% of the sub-image 310_2. Overlapping ratios of the other sub-images may be deduced on this basis. In the embodiment, the ratio of the sub-image overlapping area formed by two sub-images projected by two projectors to the sub-image is 20%. That is, the sub-image overlapping area actually occupies 384 (=1920*20%) pixels.

The controller 110 first calculates the number of pixels to be obtained by slicing of a to-be-projected panoramic image. After calculation, it may be known that the first projector 120_1 is to project a sub-image having pixels ranging from 1 to 1920. Considering the overlapping area of 20%, the second projector 120_2 is to project a sub-image having pixels ranging from 1536 to 3456, and the third projector 120_3 is to project a sub-image having pixels ranging from 3072 to 4992. Since the fourth projector 120_4 is to project 20% of the image to be projected by the first projector 120_1, the rest of the sub-image projected by the fourth projector 120_4 has the rest pixels (1920 minus 384). That is, the rest of the sub-image projected by the fourth projector 120_4 has pixels ranging from 4608 to 6144. Therefore, the to-be-projected panoramic image has pixels of 6144*1080, and a panoramic image is projected accordingly. The controller 110 copies an image (i.e., the first edge image 420) having pixels from 1 to 384 which is adjacent to the first edge 440 of the to-be-projected panoramic image and pastes the image adjacent to the second edge 450, so as to generate the extended image 430 corresponding to the sub-image overlapping area. Then, the controller 110 transmits the image data $IMD_1$ to $IMD_4$ corresponding to images having the pixels ranging from 1 to 1920, the pixels ranging from 1536 to 3456, the pixels ranging from 3072 to 4992, the pixels ranging from 4608 to 6144, and the pixels ranging from 1 to 384 respectively to the projectors 120_1, 120_2, 120_3, and 120_4.

In the above embodiment, the projectors 120_1, 120_2, 120_3, and 120_4 project the grid pattern images as the test images. However, the projectors 120_1, 120_2, 120_3, and 120_4 may also project other images as the test images. In other embodiments, as long as an edge region of the test image has at least one test pattern, the controller 110 may determine the overlapping area of projection ranges of the N projectors 120_1, 120_2 ... and 120_N through the captured images $CIM_1$ to $CIM_N$ that respectively contain the N test images, and obtain the sub-image overlapping range information.

Here, it should be noted that image deformation may occur when the N cameras 510_1, 510_2 ... and 510_N respectively capture the N test images. Therefore, the controller 110 may further be configured to perform deformation correction on each of the captured images $CIM_1$ to $CIM_N$. However, the sub-image overlapping areas 320_0, 320_1 ... and 320_N do not include a black frame area generated by performing the deformation correction.

Figure 6:
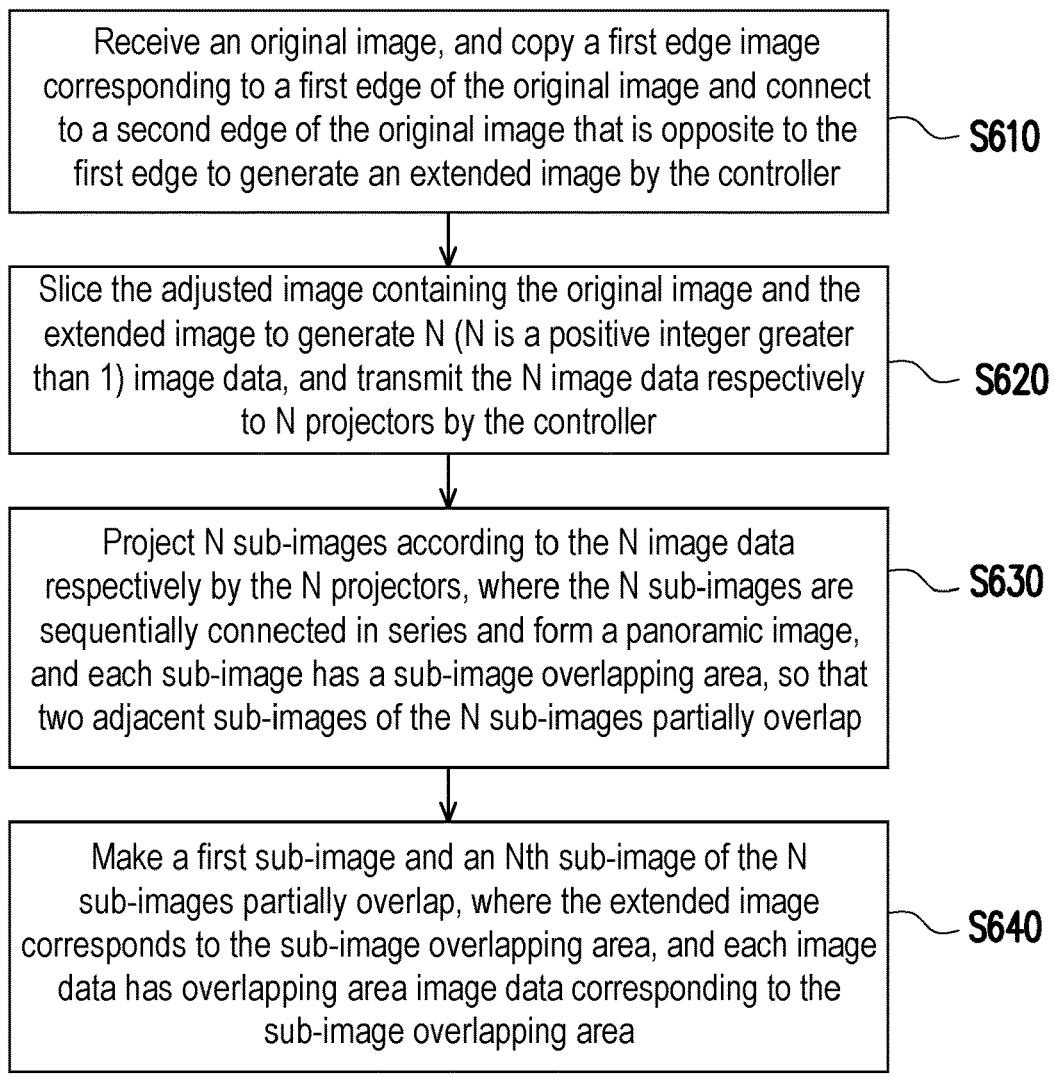
FIG. 6 is a schematic flowchart of an operation of a display system for displaying a panoramic image according to an embodiment of the disclosure.

FIG. 6 is a schematic flowchart of an operation of a display system for displaying a panoramic image according to an embodiment of the disclosure. Referring to FIG. 1 to FIG. 6, in step S610, by the controller 110, the original image 410 is received, and the first edge image 420 corresponding to the first edge 440 of the original image 410 is copied to connect to the second edge 450 of the original image 410 that is opposite to the first edge 440, so as to generate the extended image. In step S620, by the controller 110, the adjusted image containing the original image 410 and the extended image is sliced to generate the N image data $IMD_1$ to $IMD_N$, and the N image data $IMD_1$ to $IMD_N$ are respectively transmitted to the N projectors 120_1 to 120_N. N is a positive integer greater than 1. In step S630, the N sub-images are respectively projected according to the N image data $IMD_1$ to $IMD_N$ by the N projectors 120_1 to 120_N. The N sub-images are sequentially connected in series and form a panoramic image, and each of the sub-images has the sub-image overlapping area so that two adjacent sub-images of the N sub-images partially overlap. In step S640, the first sub-image and the $N^{th}$ sub-image of the N sub-images are made to partially overlap. The extended image corresponds to the sub-image overlapping area. Each of the image data has the overlapping area image data corresponding to the sub-image overlapping area.

In an embodiment of the disclosure, an operation method of the display system 100 for displaying a panoramic image further includes that the brightness information of the overlapping area image data is adjusted by the controller 110, so that the brightness of each of the sub-images 310_1, 310_2 . . . and 310_N corresponding to sub-image overlapping areas 320_0, 320_1 . . . and 320_N decreases in the direction toward the edge of each of the sub-images.

In an embodiment of the disclosure, in the operation method of the display system 100 for displaying a panoramic image, the sub-image overlapping area 320_0, 320_1 . . . and 320_N of teach sub-images 310_1, 310_2 . . . and 310_N occupies 20% of the corresponding sub-image 310_1, 310_2 . . . and 310_N.

Figure 7:
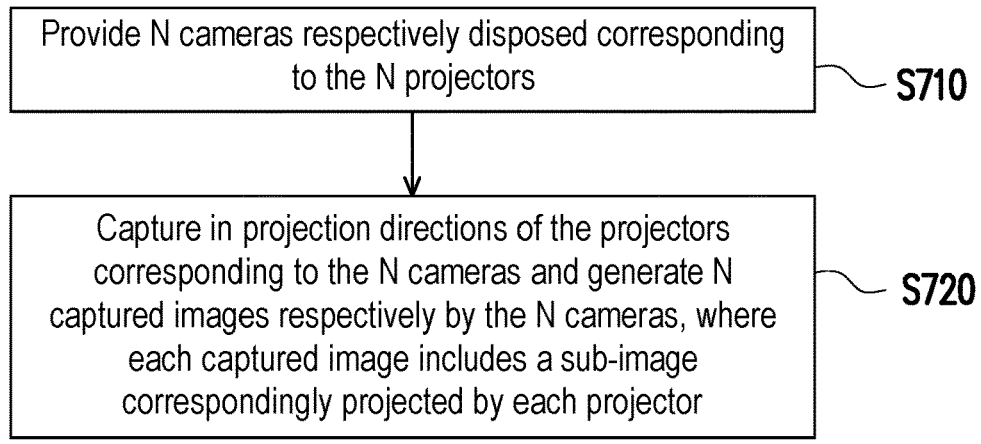
FIG. 7 is a schematic flowchart of an operation in an initialization stage of a display system for displaying a panoramic image according to an embodiment of the disclosure.

FIG. 7 is a schematic flowchart of an operation in an initialization stage of a display system for displaying a panoramic image according to an embodiment of the disclosure. Referring to FIG. 1 to FIG. 7, in step S710, the display system 500 provides the N cameras 510_1, 510_2 . . . and 510_N respectively disposed corresponding to the N projectors 120_1, 120_2 . . . and 120_N. In step S720, capturing is performed by the N cameras 510_1, 510_2 . . . and 510_N in projection directions of the corresponding projectors, so as to generate the N captured images. Each of the captured images includes the sub-images correspondingly projected by the projectors 120_1, 120_2 . . . and 120_N.

In an embodiment of the disclosure, an operation method in the initialization stage of the display system 500 for displaying a panoramic image further includes that the adjusted image is sliced according to the sub-image overlapping range information to generate the N image data by the controller 110. The operation method further includes that, in the initialization stage, the N projectors 120_1, 120_2 . . . and 120_N are controlled to project the N test images and the N cameras 510_1, 510_2 . . . and 510_N are controlled to capture, so as to obtain the sub-image overlapping range information by analyzing the N captured images by the controller 110.

In an embodiment of the disclosure, the edge region of each of the test images has at least one test pattern in the operation method in the initialization stage of the display system 500 for displaying a panoramic image.

In an embodiment of the disclosure, each of the test images has a grid pattern array in the operation method in the initialization stage of the display system 500 for displaying a panoramic image.

In an embodiment of the disclosure, the operation method in the initialization stage of the display system 500 for displaying a panoramic image further includes that the deformation correction is performed on each of the captured images by the controller 110. The sub-image overlapping areas 320_0, 320_1 . . . and 320_N do not include the black frame area generated by performing the deformation correction.

In summary, the embodiments of the disclosure have at least one of the following advantages or effects. In the disclosure, the controller copies the first edge image corresponding to the first edge of the original image and connects the first edge image to the second edge of the original image that is opposite to the first edge to generate the extended image, so that the first sub-image and the $N^{th}$ sub-image of the N sub-images partially overlap. In this way, it is possible to avoid the problem that images are not completely aligned at the stitching boundaries due to deviation of relative position of a projector in use or the like, and to avoid generating a stitching gap with no image. Moreover, the disclosure may further improve the viewing experience of users.

The above are only preferred embodiments of the disclosure and are not intended to limit the scope of the disclosure; that is, all simple and equivalent changes and modifications made according to the claims and the contents of the disclosure are still within the scope of the disclosure. In addition, any of the embodiments or the claims of the disclosure are not required to achieve all of the objects or advantages or features disclosed herein. In addition, the abstract and title are used to assist in the search of patent documents and are not intended to limit the scope of the disclosure. In addition, the terms "first," "second" and the like mentioned in the specification or the claims are used only to name the elements or to distinguish different embodiments or scopes and are not intended to limit the upper or lower limit of the number of the elements.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A display system for displaying a panoramic image, comprising N projectors and a controller, wherein:

the N projectors respectively project N sub-images according to N image data, wherein the N sub-images are sequentially connected and form a panoramic image, each of the N sub-images has a sub-image overlapping area, so that two adjacent sub-images of the N sub-images partially overlap, and a first sub-image and an $N^{th}$ sub-image of the N sub-images partially overlap; and the controller is configured to receive an original image, copy a first edge image corresponding to a first edge of the original image and connect the first edge image to a second edge of the original image that is opposite to the first edge, so as to generate an extended image corresponding to the sub-image overlapping area of the $N^{th}$ sub-image adjacent to the second edge, the controller is configured to slice an adjusted image containing the original image and the extended image to generate the N image data, and transmits the N image data respectively to the N projectors;

wherein each of the N image data has overlapping area image data corresponding to the sub-image overlapping area, and N is a positive integer greater than 1.

2. The display system for displaying a panoramic image according to claim 1, wherein the controller is further configured to adjust brightness information of the overlapping area image data, so that brightness of each of the N sub-images corresponding to the sub-image overlapping area decreases in a direction toward an edge of each of the N sub-images.

3. The display system for displaying a panoramic image according to claim 1, wherein the sub-image overlapping area of each of the N sub-images occupies 20% of the corresponding N sub-image.

4. The display system for displaying a panoramic image according to claim 1, further comprising:

N cameras respectively disposed corresponding to the N projectors, and configured to respectively capture in projection directions of the N projectors corresponding to the N cameras, so as to generate N captured images, wherein each of the N captured images comprises the sub-image correspondingly projected by each of the N projectors.

5. The display system for displaying a panoramic image according to claim 4, wherein the controller is further configured to:

slice the adjusted image according to sub-image overlapping range information to generate the N image data in a display stage; and control the N projectors to project N test images and control the N cameras to capture, so as to obtain the sub-image overlapping range information by analyzing the N captured images in an initialization stage.

6. The display system for displaying a panoramic image according to claim 5, wherein an edge region of each of the N test images has at least one test pattern.

7. The display system for displaying a panoramic image according to claim 5, wherein each of the N test images has a grid pattern array.

8. The display system for displaying a panoramic image according to claim 5, wherein the controller is further configured to perform deformation correction on each of the N captured images, wherein the sub-image overlapping area does not comprise a black frame area generated by performing the deformation correction.

9. An operation method of a display system for displaying a panoramic image, wherein the display system comprises N projectors and a controller, and the operation method comprises:

by the controller, receiving an original image, and copying a first edge image corresponding to a first edge of the original image and connecting the first edge image to a second edge of the original image that is opposite to the first edge, so as to generate an extended image;

by the controller, slicing an adjusted image containing the original image and the extended image to generate N image data, and transmitting the N image data respectively to the N projectors; and by the N projectors, projecting N sub-images respectively according to the N image data, wherein the N sub-images are sequentially connected and form a panoramic image, each of the N sub-images has a sub-image overlapping area, so that two adjacent sub-images of the N sub-images partially overlap, and that a first sub-image and an $N^{th}$ sub-image of the N sub-images partially overlap;

wherein the extended image corresponds to the sub-image overlapping area of the $N^{th}$ sub-image adjacent to the second edge, each of the N image data has overlapping area image data corresponding to the sub-image overlapping area, and N is a positive integer greater than 1.

10. The operation method of a display system for displaying a panoramic image according to claim 9, the operation method further comprising:

adjusting brightness information of the overlapping area image data by the controller, so that brightness of each of the N sub-images corresponding to the sub-image overlapping area decreases in a direction toward an edge of each of the N sub-images.

11. The operation method of a display system for displaying a panoramic image according to claim 9, wherein the sub-image overlapping area of each of the N sub-images occupies 20% of the corresponding sub-image.

12. The operation method of a display system for displaying a panoramic image according to claim 11, the operation method further comprising:

by the controller, slicing the adjusted image according to sub-image overlapping range information to generate the N image data in a display stage; and by the controller, controlling the N projectors to project N test images and controlling the N cameras to capture, so as to obtain the sub-image overlapping range information by analyzing the N captured images in an initialization stage.

13. The operation method of a display system for displaying a panoramic image according to claim 9, wherein the display system further comprises N cameras respectively disposed corresponding to the N projectors, and the operation method further comprises:

capturing in projection directions of the N projectors corresponding to the N cameras respectively by the N cameras, so as to generate N captured images, wherein each of the N captured images comprises the sub-image correspondingly projected by each of the N projectors.

14. The operation method of a display system for displaying a panoramic image according to claim 13, wherein an edge region of each of the N test images has at least one test pattern.

15. The operation method of a display system for displaying a panoramic image according to claim 13, wherein each of the N test images has a grid pattern array.

16. The operation method of a display system for displaying a panoramic image according to claim 13, the operation method further comprising:

performing deformation correction on each of the N captured images by the controller, wherein the sub-image overlapping area does not comprise a black frame area generated by performing the deformation correction.

* * * * *